US009769421B2

(12) United States Patent
Chang et al.

(10) Patent No.: US 9,769,421 B2
(45) Date of Patent: Sep. 19, 2017

(54) MOBILE TERMINAL, DISPLAY APPARATUS AND CONTROL METHOD THEREOF

(71) Applicant: Samsung Electronics Co., Ltd., Suwon-si, Gyeonggi-do (KR)

(72) Inventors: Woo-Yong Chang, Yongin-si (KR); Seung-dong Yu, Osan-si (KR); Se-jun Park, Yongin-si (KR); Min-Jeong Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/440,570

(22) Filed: Feb. 23, 2017

(65) Prior Publication Data

US 2017/0163933 A1 Jun. 8, 2017

Related U.S. Application Data

(63) Continuation of application No. 15/359,270, filed on Nov. 22, 2016, which is a continuation of application
(Continued)

(30) Foreign Application Priority Data

Nov. 13, 2009 (KR) .................. 10-2009-0109774

(51) Int. Cl.
*H04N 7/14* (2006.01)
*G06F 3/14* (2006.01)
*G06F 3/0488* (2013.01)

(52) U.S. Cl.
CPC ......... *H04N 7/147* (2013.01); *G06F 3/04883* (2013.01); *G06F 3/1454* (2013.01); *H04N 7/148* (2013.01)

(58) Field of Classification Search
CPC ........................................................ H04N 7/14
(Continued)

(56) References Cited

U.S. PATENT DOCUMENTS 5,915,091 A * 6/1999 Ludwig ................ G06Q 10/10
348/E7.081
6,396,598 B1 5/2002 Kashiwagi et al.
(Continued)

FOREIGN PATENT DOCUMENTS

CN 1518326 A 8/2004
CN 1946213 A 4/2007
(Continued)

OTHER PUBLICATIONS

Russian Office Action dated Nov. 18, 2014 issued in counterpart application No. 2012119473/07.
(Continued)

*Primary Examiner* — Olisa Anwah
(74) *Attorney, Agent, or Firm* — Jefferson IP Law, LLP

(57) ABSTRACT

Disclosed is a control method for a display apparatus and a mobile terminal which includes a camera for taking a photograph and generating an image; a voice input unit which is used to input a voice; a user input unit which receives a user's input; a display unit which displays the image thereon; a wireless communication unit which communicates with a counterpart mobile terminal through a wireless network; and a controller which performs a video call by transmitting to the counterpart mobile terminal video call data comprising a video generated by the camera and a voice input by the voice input unit according user input, displays on the display unit a shared image during the video call, and transmits to the counterpart mobile terminal the shared image added to the video call data.

30 Claims, 17 Drawing Sheets

Related U.S. Application Data

No. 13/858,618, filed on Apr. 8, 2013, now Pat. No. 9,554,088, which is a continuation of application No. 12/943,401, filed on Nov. 10, 2010, now Pat. No. 8,436,887.

(58) Field of Classification Search
 USPC .................. 348/14.01, 14.02, 14.03, 14.14
 See application file for complete search history.

(56) References Cited

U.S. PATENT DOCUMENTS

| | | | |
|---|---|---|---|
| 7,058,689 | B2 | 6/2006 | Parker et al. |
| 7,355,619 | B2 | 4/2008 | Motohashi |
| 7,999,840 | B2 | 8/2011 | Kim et al. |
| 8,106,856 | B2 | 1/2012 | Matas et al. |
| 8,248,449 | B2 | 8/2012 | Han |
| 8,279,251 | B2 | 10/2012 | Cho |
| 8,355,862 | B2 | 1/2013 | Matas et al. |
| 2004/0145654 | A1* | 7/2004 | Motohashi ............. H04N 7/147 348/14.02 |
| 2004/0237033 | A1 | 11/2004 | Woolf et al. |
| 2005/0064858 | A1 | 3/2005 | Makela et al. |
| 2006/0203758 | A1 | 9/2006 | Tee et al. |
| 2007/0039025 | A1 | 2/2007 | Kraft et al. |
| 2007/0064091 | A1 | 3/2007 | Park |
| 2007/0115346 | A1 | 5/2007 | Kim et al. |
| 2008/0062249 | A1 | 3/2008 | Nagase et al. |
| 2008/0184124 | A1 | 7/2008 | Agarwal et al. |
| 2008/0288857 | A1 | 11/2008 | Duncan et al. |
| 2009/0024721 | A1 | 1/2009 | Kumamoto |
| 2009/0077497 | A1 | 3/2009 | Cho et al. |
| 2009/0309956 | A1 | 12/2009 | Hawkins et al. |
| 2010/0053342 | A1 | 3/2010 | Hwang et al. |
| 2010/0125780 | A1 | 5/2010 | Wang et al. |
| 2010/0188548 | A1 | 7/2010 | Robinson et al. |
| 2010/0235793 | A1 | 9/2010 | Ording et al. |
| 2010/0306670 | A1 | 12/2010 | Quinn et al. |
| 2011/0044438 | A1 | 2/2011 | Wang et al. |
| 2011/0078624 | A1 | 3/2011 | Missig et al. |
| 2011/0081923 | A1 | 4/2011 | Forutanpour et al. |
| 2014/0032616 | A1 | 1/2014 | Nack |

FOREIGN PATENT DOCUMENTS

| | | |
|---|---|---|
| CN | 101150706 A | 3/2008 |
| CN | 101188728 A | 5/2008 |
| CN | 201127081 Y | 10/2008 |
| EP | 1 441 522 A1 | 7/2004 |
| JP | 5-344498 A | 12/1993 |
| JP | 07-222839 A | 8/1995 |
| JP | 11-134327 A | 5/1999 |
| JP | 2002132635 A | 5/2002 |
| JP | 2003-244289 A | 8/2003 |
| JP | 2004228805 A | 8/2004 |
| JP | 2007-181157 A | 12/2005 |
| JP | 2007129365 A | 5/2007 |
| JP | 2007214882 A | 8/2007 |
| JP | 2008252563 A | 10/2008 |
| JP | 2009231963 A | 10/2009 |
| JP | 1155704 | 2/2016 |
| KR | 1020000063224 A | 11/2000 |
| KR | 100819705 B1 | 4/2008 |
| RU | 2008 104 856 A | 8/2009 |
| WO | 2007097253 A1 | 8/2007 |

OTHER PUBLICATIONS

Japanese Office Action dated Aug. 31, 2015 issued in counterpart application No. 2012-538760, 7 pages.
Microsoft, Microsoft Office Live Meeting Feature Guide, Microsoft Corporation, Jan. 2005, pp. 1-17.
Microsoft, Microsoft Office Live Meeting User Guide.
Microsoft, Configuring and Using NetMeeting.
Microsoft, NetMeeting, Aug. 6, 2004, https://technet.microsoft/com/en-us/library/bb457173(d=printer).aspx.
Wikipedia, Microsoft NetMeeting, https://en.wikipedia.orgfwiki/Microsoft_NetMeeting.
Web Conference, Software Installation Considerations Whitepaper, webconference.com, Glendale, California.
Web Conference, Version 5 Manual, https://www.webconference.com/downloads/usermanual/index.htm.
Australian Office Action, "Examination Report No. 1 for Standard Patent Application" dated May 4, 2017, issued in the Australian Application No. 2016202714, pp. 1-3.
Japanese Office Action, "Trial Decision" dated May 15, 2017, issued in the Japanese Application No. 2012-538760.
Russian Office Action dated May 29, 2017 issued in the Russian Application No. 2015134510/07, pp. 1-3.
Russian Office Action "Decision on Grant" dated Apr. 1, 2015 issued in the Russian Application No. 2012119473/07.
Russian Office Action dated Feb. 21, 2017 issued in the Russian Application No. 2015134510/07.
European Search Report dated May 3, 2017 issued in the European Application No. 10830182.1.

* cited by examiner

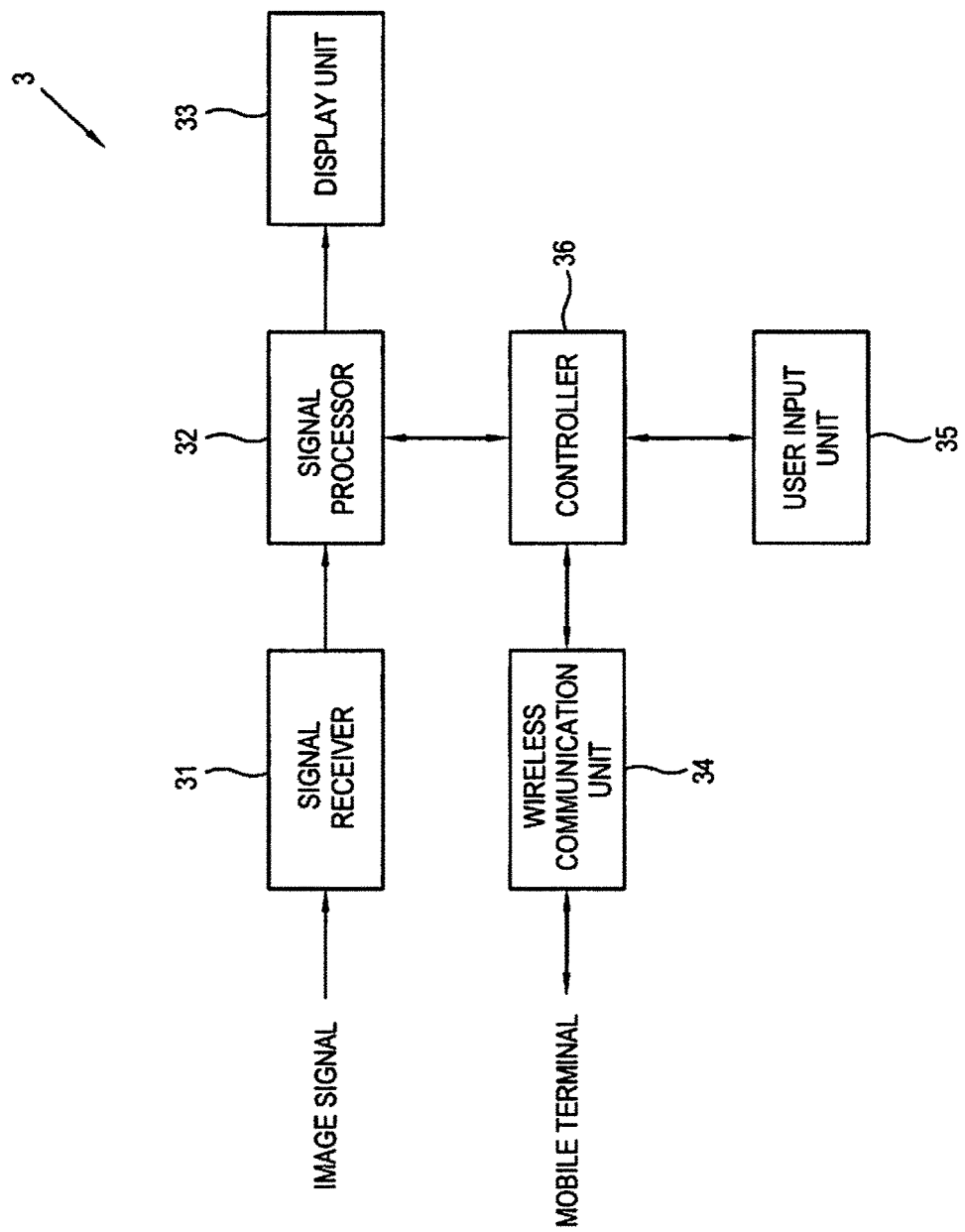

MOBILE TERMINAL, DISPLAY APPARATUS AND CONTROL METHOD THEREOF

PRIORITY

This application is a continuation application of prior application Ser. No. 15/359,270, filed on Nov. 22, 2016; which is a continuation of prior application Ser. No. 13/858,618, filed on Apr. 8, 2013, which issued as U.S. Pat. No. 9,554,088 on Jan. 24, 2017; which is a continuation of prior application Ser. No. 12/943,401, filed on Nov. 10, 2010, which issued as U.S. Pat. No. 8,436,887 on May 7, 2013; and claims the benefit under 35 U.S.C. §119(a) of a Korean patent application filed on Nov. 13, 2009 in the Korean Intellectual Property Office and assigned Application Serial No. 10-2009-0109774, the entire disclosure of each of which is hereby incorporated by reference.

BACKGROUND OF THE INVENTION

1. Field of the Invention

The present invention relates generally to a mobile terminal, a display apparatus and a control method thereof, and more particularly, to a method and apparatus in which a mobile terminal shares images and image information with a counterpart mobile terminal during a video call.

2. Description of the Related Art

In recent years, mobile terminals such as mobile phones, Portable Digital Assistants (PDAs) and mobile Personal Computers (PCs) are being widely used and drawing much attention due to improved functionality and performance. Such mobile terminals provide not only calling functionality but also a multimedia functionality such as playing music or movies, message transmitting and receiving functions including text messages and voice messages among other various functions.

Particularly, mobile terminals are capable of providing video call functionality by which a user may send or receive video as well as voice while talking over the phone with a counterpart. During such video call, sufficient and free information sharing is needed.

SUMMARY OF THE INVENTION

Accordingly, the present invention provides a mobile terminal including a camera which captures image and generates photograph and video; a voice input unit which is used to input a voice; a user input unit which receives a user's input; a display unit which displays the image thereon; a wireless communication unit which communicates with a counterpart mobile terminal through a wireless network; and a controller which performs a video call by transmitting to the counterpart mobile terminal video call data comprising a video generated by the camera and a voice input by the voice input unit according to the user's input, displays on the display unit a shared image during the video call, and transmits to the counterpart mobile terminal the shared image added to the video call data.

According to another embodiment of the present invention, a mobile terminal is provided, which includes a camera for taking a photograph and generating an image; a voice input unit which is used to input a voice; a display unit which displays the image thereon; a wireless communication unit which communicates with a counterpart mobile terminal through a wireless network; and a controller which performs a video call by transmitting to the counterpart mobile terminal a video generated by the camera and a voice input by the voice input unit, receives video call data comprising a video of a video call and a shared image from the counterpart mobile terminal during the video call, and displays on the display unit the video of the video call and the shared image. The video call data may further include edited information of the shared image, and the controller may display the shared image reflecting the edited information.

The mobile terminal may further include a user input unit which receives a user's input, and the controller may edit the shared image according to the user's input and transmit the edited information of the shared image to the counterpart mobile terminal.

The mobile terminal may further include a user input unit which receives a user's input, and the controller may select the shared image according to the user's input and transmit the selection information of the shared image to the counterpart mobile terminal.

The mobile terminal may further include a user input unit which receives a user's input, and the controller may transmit the shared image to at least one electronic device selected by user input. According to another embodiment of the present invention, a mobile terminal is provided, which includes a camera for taking a photograph and generating an image; a voice input unit which is used to input a voice; a display unit which displays the image thereon; a wireless communication unit which communicates with a counterpart mobile terminal and at least one electronic device having a display function through a wireless network; and a controller which performs a video call by transmitting to the counterpart mobile terminal a video generated by the camera and the voice input by the voice input unit, receives video call data comprising a video of a video call and a shared image from the counterpart mobile terminal during the video call, and transmits the shared image to the electronic device.

The mobile terminal may further include a user input unit which receives a user's input, and the controller may select the shared image according to the user's input and transmit selection information of the shared image to the counterpart mobile terminal.

The mobile terminal may further include a user input unit which receives a user's input, and the controller may transmit the shared image to at least one of a plurality of electronic devices selected according to the user's input.

According to another embodiment of the present invention, a display apparatus is provided, which includes a signal receiver which receives an image signal; a signal processor which processes the image signal received by the signal receiver; a display unit which displays thereon an image based on the image signal processed by the signal processor; a wireless communication unit which communicates with a mobile terminal through a wireless network; a user input unit which receives a user's input; and a controller which receives a shared image and first edited information of the shared image from the mobile terminal, displays on the display unit the shared image reflecting the first edited information, edits the shared image according to the user's input and transmits second edited information to the mobile terminal according to the user's input.

According to another embodiment of the present invention, a control method of a mobile terminal which is connected to a counterpart mobile terminal through a wireless network, the control method is provided, which includes performing a video call by transmitting and receiving video call data comprising a video and a voice to/from the counterpart mobile terminal; displaying a shared image during the video call; and transmitting the video call data to the counterpart mobile terminal by adding the shared image to the data.

The control method may further include editing the shared image according to a user's input, and the transmitting may include transmitting to the counterpart mobile terminal edited information of the shared image by being added to the video call data.

The control method may further include receiving edited information of a counterpart for the shared image from the counterpart mobile terminal; and displaying the shared image reflecting the edited information of the counterpart.

The control method may further include receiving selection information of the shared image from the counterpart mobile terminal; and selecting the shared image according to the selection information.

According to another embodiment of the present invention, a control method of a mobile terminal which is connected to a counterpart mobile terminal through a wireless network is provided, which includes performing a video call by transmitting and receiving a video and a voice to/from the counterpart mobile terminal; receiving video call data comprising the video of the video call and the shared image from the counterpart mobile terminal during the video call; and displaying the video and the shared image.

The control method may further include editing the shared image according to user input, and transmitting edited information according to the user's input to the counterpart mobile terminal.

The control method may further include selecting the shared image according to user input, and transmitting selection information of the shared image to the counterpart mobile terminal.

The control method may further include transmitting the shared image to a display apparatus which is connected by a wireless network.

The control method may further include selecting at least one of a plurality of electronic devices which have a display function, and transmitting the shared image to the at least one selected electronic device.

The control method may further include converting the shared image to be transmitted corresponding to a characteristic of the selected electronic device.

According to another embodiment of the present invention, a control method of a mobile terminal which is connected to a counterpart mobile terminal and at least one electronic device having a display function, through a wireless network, the control method is provided, which includes performing a video call by transmitting and receiving a video and a voice to/from the counterpart mobile terminal; receiving video call data comprising a video of a video call and a shared image from the counterpart mobile terminal during the video call; and transmitting the shared image to the electronic device.

The control method may further include receiving a user's edited information from the display apparatus; and transmitting a user's edited information to the counterpart mobile terminal.

The control method may further include selecting the shared image according to a user's input; and transmitting selection information of the shared image to the counterpart mobile terminal.

The control method may further include selecting at least one of a plurality of electronic devices, and the transmitting may include transmitting the shared image to the at least one selected electronic device.

The control method may further include converting the shared image to be transmitted corresponding to the characteristic of the selected electronic device.

According to another embodiment of the present invention, a control method of a display apparatus which displays an image by receiving and processing an image signal, and is connected to a mobile terminal through a wireless network, is provided, which includes receiving a shared image and first edited information of the shared image from the mobile terminal; displaying the shared image reflecting the first edited information; editing the shared image according to a user's input; and transmitting second edited information according to the user's input to the mobile terminal.

BRIEF DESCRIPTION OF THE DRAWINGS

The above and other aspects, features and advantages of certain embodiments of the present invention will become apparent and more readily understood from the following description, taken in conjunction with the accompanying drawings, in which:

FIG. 7 is a block diagram of the display apparatus in FIG. 1;

DETAILED DESCRIPTION OF THE EMBODIMENTS OF THE PRESENT INVENTION

Figure 1:
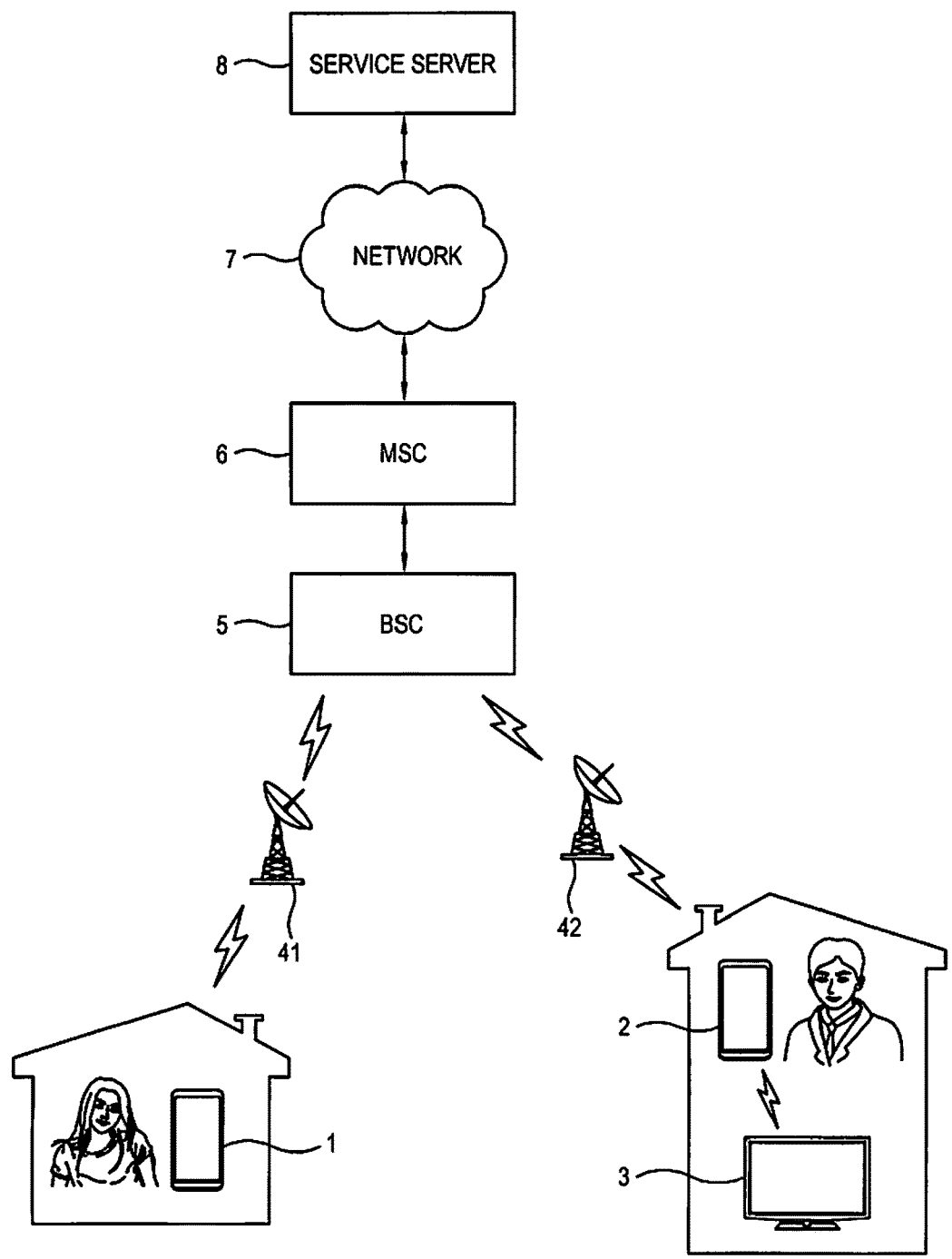
FIG. 1 is a diagram illustrating a mobile terminal and a display apparatus according to an embodiment of the present invention.

Hereinafter, various embodiments of the present invention will be described in detail with reference to accompanying drawings so as to be easily understood by a person having ordinary skill in the art. Various changes and modifications of the embodiments described herein can be made without departing from the scope and spirit of the invention. In addition, descriptions of well-known functions and parts are omitted for clarity, and like reference numerals refer to like elements throughout.

FIG. 1 illustrates a mobile terminal according to an embodiment of the present invention. As shown therein, mobile terminals 1 and 2 are connected in a wireless network and communicate with each other. Mobile terminals 1 and 2 according to the present embodiment provide a wireless network communication function and may be various devices such as a mobile phone, a mobile PC or a PDA.

Mobile terminals 1 and 2 also perform a calling function for a telephone call between a caller and a receiver. One of the mobile terminals is a caller terminal and the other one is a receiver terminal. A telephone call which is made by mobile terminals 1 and 2 includes a video call by which users transmit and receive video and voice during the telephone call. To perform a video call function according to the present embodiment, mobile terminals 1 and 2 may perform various communications such as Wideband Code Division Multiple Access (W-CDMA), Enhanced Data rates for GSM Evolution (EDGE), Long Term Evolution (LTE), and Worldwide Interoperability for Microwave Access (WiMAX).

As shown in FIG. 1, a wireless network according to the embodiment of the present invention may include base station transmission systems 41 and 42 to transmit and receive wireless communication signals with mobile terminals 1 and 2, a base station controller 5 to control and manage the plurality of base station transmission systems 41 and 42, and a mobile switching center 6 to perform a call connection between mobile terminals 1 and 2 through base station controller 5. Also, as shown in FIG. 1, a service server 8 is in link with the mobile switching center 6 through a network 7, and provides service for the video call between the pair of mobile terminals 1 and 2. Network 7 may include the Internet.

During a video call, mobile terminals 1 and 2 according to the embodiment of the present invention enable a caller and a receiver to share a predetermined image (hereinafter, "shared image"). During a video call, mobile terminals 1 and 2 also enable a caller or a receiver to edit the shared image and share the edited result (hereinafter, "edited information"). Hereinafter, mobile terminals 1 and 2, will be described according to the embodiment of the present invention, in more detail with reference to FIG. 2.

Figure 2:
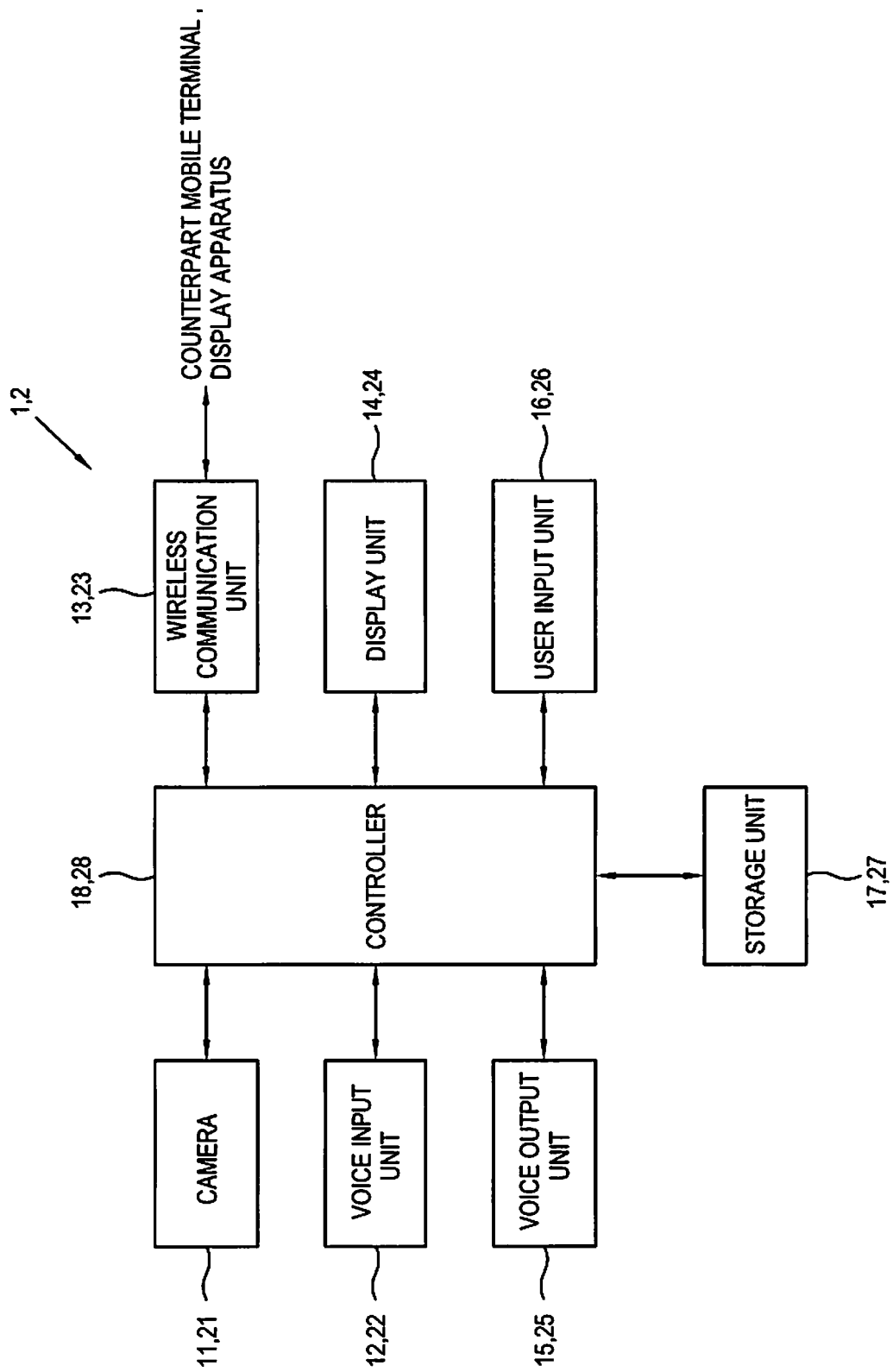
FIG. 2 is a block diagram of the mobile terminal in FIG. 1.

FIG. 2 is a block diagram of mobile terminals 1 and 2 according to the embodiment of the present invention. Even though the pair of mobile terminals 1 and 2 are separate apparatuses, FIG. 2 illustrates the two mobile terminals 1 and 2 together for purposes of convenience. It is assumed that, among the pair of mobile terminals 1 and 2 shown in FIG. 2, mobile terminal 1 is a caller terminal and mobile terminal 2 is a receiver terminal.

As shown therein, the caller mobile terminal 1 includes a camera 11, a voice input unit 12, a wireless communication unit 13, a display unit 14, a voice output unit 15, a user input unit 16 and a controller 18.

Camera 11 captures image and generates photograph and video used for a video call. Camera 11 may include an optical unit (not shown) including at least one light-incident lens and an imaging sensor (not shown) converting incident light into electrical data to generate an image.

Voice input unit 12 may include a voice sensor (not shown) such as a microphone, and receives a voice used for a voice call.

Wireless communication unit 13 is connected to a wireless network and communicates with the counterpart mobile terminal 2 by a predetermined wireless communication method. During a video call, wireless communication unit 13 transmits to the counterpart mobile terminal 2 video call data including a video generated by camera 11 and a voice input by voice input unit 12 and receives video call data including a video and a voice from the counterpart mobile terminal 2 according to the control of controller 18.

Display unit 14 displays thereon a video, and may include a display panel (not shown) such as a Liquid Crystal Display (LCD) panel. Display unit 14 according to the present embodiment displays thereon a video received from the counterpart mobile terminal 2 according to the control of controller 18 during a video call.

Voice output unit 15 outputs a voice, and may include a voice output unit (not shown) such as an internal speaker. Voice output unit 15 may further include a connector (not shown) to be connected to an external voice output device (not shown) such as earphones, headsets and external speakers, and may output a voice to the connected external voice output device. Voice output unit 15 according to the present embodiment outputs a voice from the counterpart mobile terminal 2 according to the control of controller 18 during a voice call or a video call.

User input unit 16 receives a user's input to manipulate mobile terminal 1. User input unit 16 may include a keypad (not shown) including a plurality of keys to input numbers, or characters. The keypad according to the present embodiment may include a touch pad. User input unit 13 according to the present embodiment may further include a sensor (not shown) to sense a user's motion or gesture as a user's input on display unit 14. The sensor of user input unit 13 may include a touch screen overlapping the display panel of display unit 14 such as an LCD panel.

Controller 18 controls mobile terminal 1 as a whole. If a video call function is selected by user input through user input unit 16, controller 18 refers to an input telephone number and requests a call connection to the counterpart mobile terminal 2 through wireless communication unit 13. If the call connection to the counterpart mobile terminal 2 is made, controller 18 transmits video call data including a video generated by camera 11 and a voice input by voice input unit 12 to the counterpart mobile terminal 2 through wireless communication unit 13, and controls display unit 14 and voice output unit 15 to output the video and the voice included in the video call data received from the counterpart mobile terminal 2 through wireless communication unit 13, respectively.

Returning to FIG. 2, the receiver mobile terminal 2 includes a camera 21, a voice input unit 22, a wireless communication unit 23, a display unit 24, a voice output unit 25, a user input unit 26 and a controller 28. Camera 21, voice input unit 22, wireless communication unit 23, display unit 24, voice output unit 25, user input unit 26 and controller 28 of the receiver mobile terminal 2, according to the present embodiment, correspond to camera 11, voice input unit 12, wireless communication unit 13, display unit 14, voice output unit 15, user input unit 16 and controller 18 of the caller mobile terminal 1, respectively. Hereinafter, unless otherwise stated herein, each element of receiver mobile terminal 2 performs the same or similar operations as those corresponding to caller mobile terminal 1.

Wireless communication unit 23 of the receiver mobile terminal 2 communicates with the counterpart mobile terminal 1 as the caller mobile terminal 1 through the wireless network. Upon receiving a request for a call connection from the counterpart mobile terminal 1, controller 28 of the receiver mobile terminal 2 informs a user of the foregoing through voice output unit 25, and initiates a video call according to user input for confirming a call response through user input unit 26. At the time of a video call, controller 28 transmits to the counterpart mobile terminal 1 a video generated by camera 21 and a voice input by voice input unit 22 through wireless communication unit 23, and controls display unit 24 and voice output unit 25 to output a video and a voice received from the counterpart mobile terminal 1 through wireless communication unit 23, respectively.

During a video call, mobile terminals 1 and 2 according to the present embodiment may display a shared image for both users to share such image. Further, mobile terminals 1 and 2 may edit the shared image, transmit the edited information to the counterpart mobile terminal and share the edited information of the shared image. Hereinafter, operations of mobile terminals 1 and 2 will be described in more detail with reference to FIGS. 3 through 6.

Figure 3:
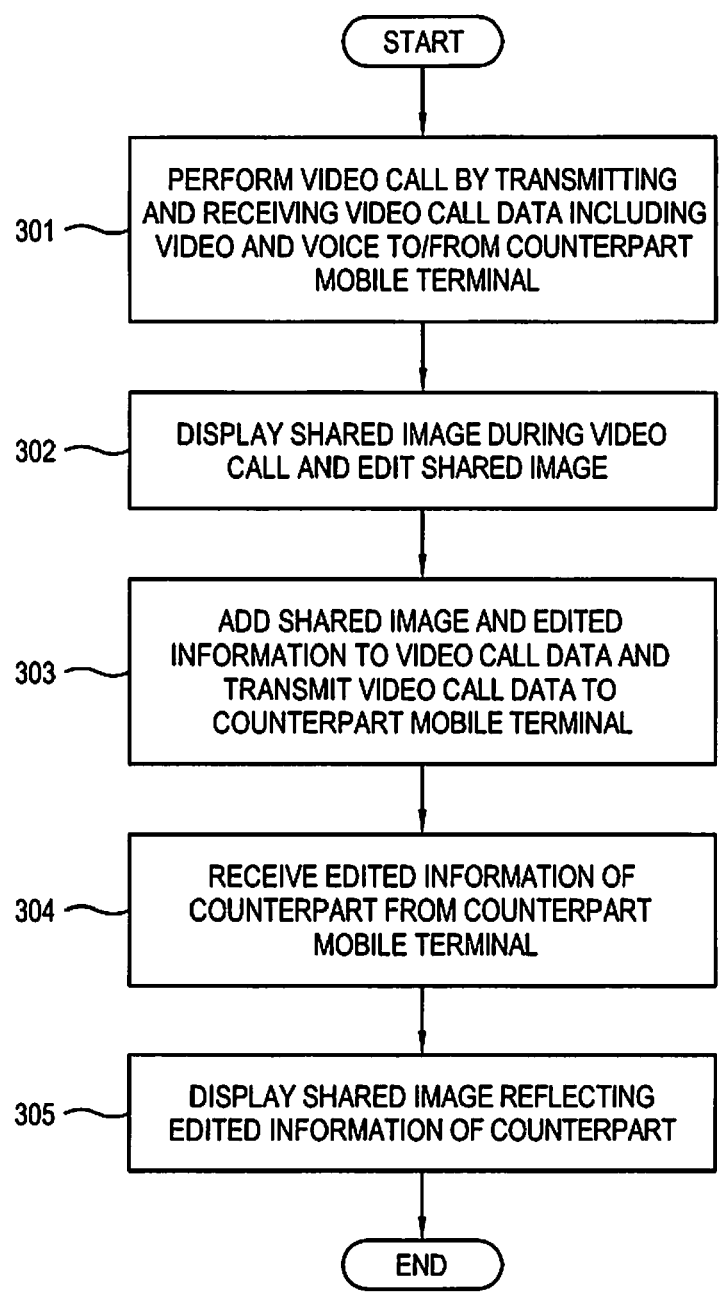
FIGS. 3 and 4 are flowcharts showing operations of the mobile terminal in FIG. 2.
Figure 4:
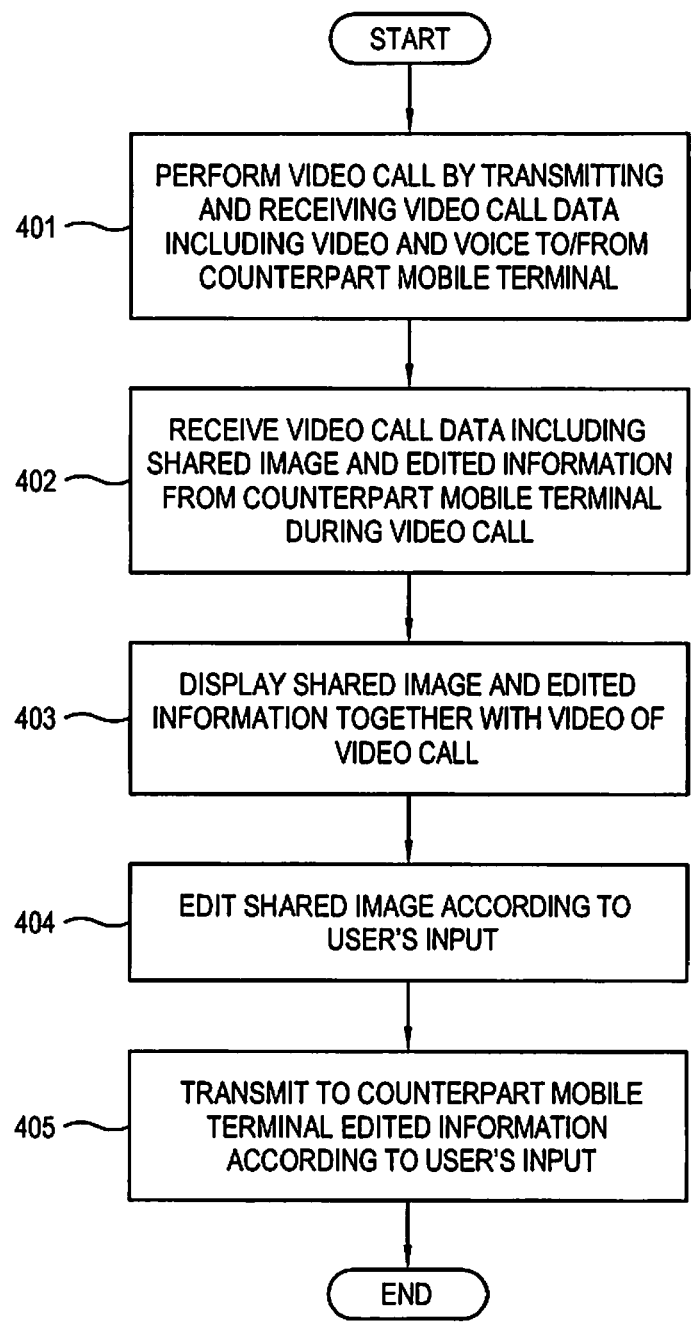

FIGS. 3 and 4 are flowcharts of detailed operations of mobile terminals 1 and 2 according to the embodiment of the present invention. FIGS. 5 and 6 illustrate a shared image and edited information which are displayed by mobile terminals 1 and 2, respectively, as shown in FIGS. 3 and 4.

Referring to FIGS. 3 and 4, mobile terminals 1 and 2 transmit and receive video call data including a video and a voice to/from the counterpart mobile terminal and perform a video call in steps 301 and 401.

Figure 5A:
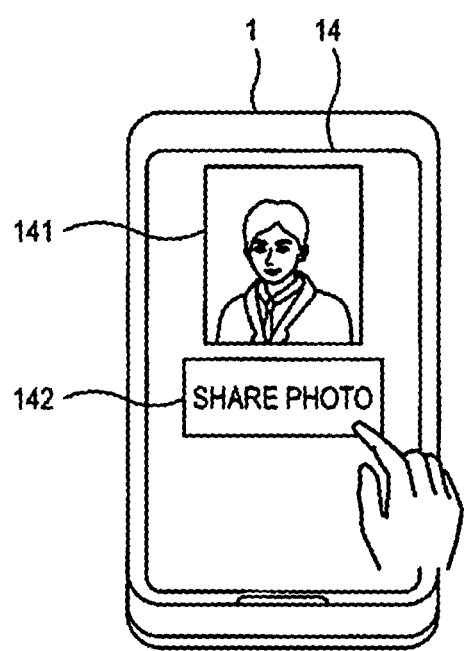
FIGS. 5A-5C and 6A-6B are diagrams illustrating display states of the mobile terminal in FIGS. 3 and 4.
Figure 5B:
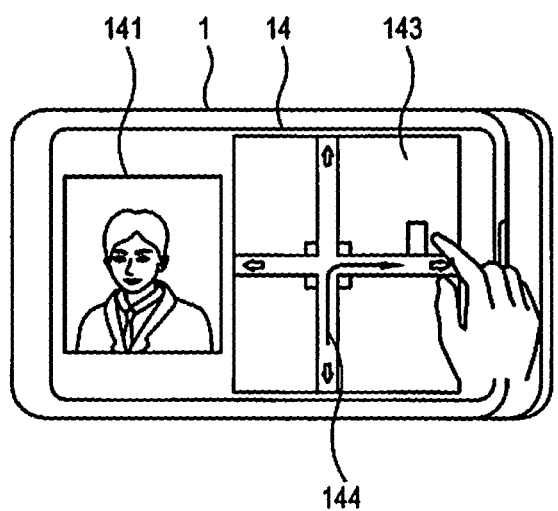

Referring to FIG. 3, in step 302 controller 18 of mobile terminal 1 displays on display unit 14 a shared image 143 together with a video 141 of a video call during the video call as shown in FIG. 5B. Controller 18 of mobile terminal 1 transmits to the counterpart mobile terminal 2 the shared image 143 displayed on display unit 14 together with the video 141 of the video call. The counterpart mobile terminal 2 may display the shared image together with the video of the video call upon receiving video call data including the shared image from mobile terminal 1 during the video call to mobile terminal 1. For example, as in FIG. 6A, a video 241 of a video call and a shared image 243 may be displayed on display unit 24 of the counterpart mobile terminal 2. Reference numeral 244 in FIG. 6A refers to edited information (to be described later) and is invisible in this step.

At operation 302, sharing an image may be initiated by a user's input through user input unit 16. For example, controller 18 of mobile terminal 1 may display on display unit 14 a menu 142 to share the image according to user input, and initiate sharing the image 143 of FIG. 5 according to user selection of menu 142 during a video call as shown in FIG. 5A. Menu 142 is displayed for sharing the image and may be displayed as a popup on video 141 for the video call. Sharing the image may be initiated upon a request from a user of the counterpart mobile terminal 2. For example, the counterpart mobile terminal 2 transmits requested information to mobile terminal 1 upon receiving a request for sharing the image from a user of the counterpart mobile terminal 2 during a video call. Upon receiving the request for sharing the image from the counterpart mobile terminal 2, mobile terminal 1 may initiate sharing the image.

Controller 18 of mobile terminal 1 displays on display unit 14 a predetermined shared image 143 as shown in FIG. 5B upon selecting menu 142 for sharing the image by a user. Shared image 143, according to the present embodiment, may be various types of images e.g., a photo, a picture or a video, selected by a user and displayed on display unit 14.

Mobile terminal 1 according to the embodiment of the present invention may further include a storage unit 17, as shown in FIG. 2, which is a non-volatile memory such as a flash memory and stores therein the shared image 143. Controller 18 of mobile terminal 1 may display on display unit 14 a shared image selecting menu (not shown) and allow a user to select the shared image 143 stored in storage unit 17 upon selecting the image sharing menu 142 by a user. The shared image 143 may be selected by not only a user of mobile terminal 1 but also by a user of the counterpart mobile terminal 2. More specifically, mobile terminal 1 transmits to the counterpart mobile terminal 2 information of the shared image 143 upon receiving a request for selecting the shared image 143 from the counterpart mobile terminal 2. A user of the counterpart mobile terminal 2 selects an image to be shared based on the information of shared image 143, and transmits to mobile terminal 1 a selection result of the shared image 143. Mobile terminal 1 displays on display unit 14 the shared image 143 according to the selection result from the counterpart mobile terminal 2.

As shown in FIG. 5B, the shared image 143 according to the present embodiment is displayed on display unit 14 together with the video 141 of the video call. Accordingly, a user may directly view the shared image 143 during a video call, and may share information more conveniently.

In step 302, controller 18 of mobile terminal 1 may edit the shared image 143 during a video call. The shared image 143 according to the present embodiment may be edited by a user's input through user input unit 16, and may be provided as various types relating to the shared image 143. For example, editing the shared image 143 includes adding an image indicating a user's gesture for the shared image 143 (hereinafter, "gesture image" 144) as shown in FIG. 5B. Controller 18 of mobile terminal 1 displays on display unit 14 the gesture image 144 overlapping the shared image 143 through a touch screen of user input unit 16 of display unit 14 if it is determined that a user's gesture for the shared image is present. The gesture image 144 according to the present embodiment is an example of the edited information according to the present invention.

Returning to FIG. 3, if the shared image 143 is edited in step 303, controller 18 of mobile terminal 1 transmits to the counterpart mobile terminal 2 video call data added with the shared image 143 and the edited information 144 through wireless communication unit 13. According to another embodiment, editing the shared image may be omitted and the video call data may not include the edited information 144. According to the following embodiment, the shared image is edited as an example, but the present invention is not limited thereto.

The method of transmitting to the counterpart mobile terminal the video call data added with the shared image 143 and the edited information 144 may vary. For example, controller 18 of mobile terminal 1 may combine the video 241 of the video call and the shared image 143 to generate combined images 241 and 143, and may transmit to the counterpart mobile terminal 2 the video 241 of the video call and the shared image 143 as the combined images 241 and 143. Further, controller 18 may reflect the edited information to the combined image.

According to another embodiment, controller 18 of mobile terminal 1 may transmit to the counterpart mobile terminal 2 the shared image 143 and the edited information 144 individually. For example, controller 18 may divide blocks of single video call data or provide blocks of a plurality of video call data, and load data of the video 241 of the video call, the shared image 143 and the edited information to the provided block and transmit such data to the counterpart mobile terminal 2. Controller 18 may add identification information to the data of the video 241 of the video call, the shared image 143 and the edited information 144 and have the counterpart mobile terminal 2 identify and process the data. The identification information according to the present embodiment may include meta data, which may include information of a format or a source of the video 241.

Referring to FIG. 4, in step 402, controller 28 of mobile terminal 2 receives the video call data including the shared image 143 and the edited information 144 from the counterpart mobile terminal 1 during a video call. For example, controller 28 of mobile terminal 2 may determine whether the counterpart mobile terminal 1 transmits the video 241 of the video call, the shared image 143 and the edited information 144 as a combined image, and control wireless communication unit 23 to receive the combined image. Controller 28 of mobile terminal 2 may confirm the identification information included in the video call data received from the counterpart mobile terminal 1, and control wireless communication unit 23 to separately receive the video 241 of the video call, the shared image 143 and the edited information 144 based on the identification information.

Figure 6A:
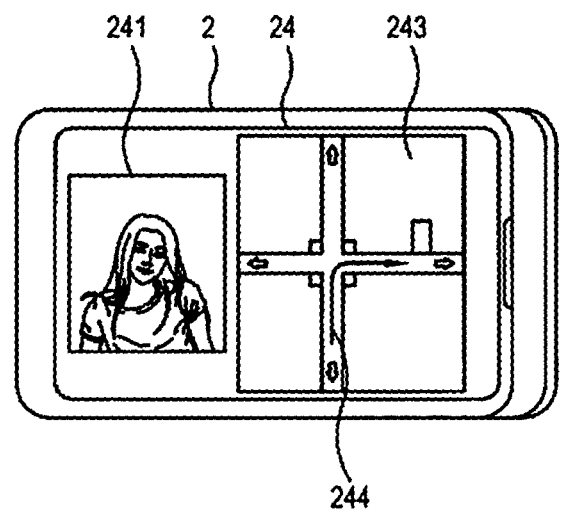

As shown in FIG. 6A, display unit 24 of mobile terminal 2, controlled by controller 28, displays the shared image 243 reflecting the edited information 244, together with the video 241 of the video call, during the video call in step 403. For example, controller 28 of mobile terminal 2 may receive combined images 241, 243 and 244 from the counterpart mobile terminal 1, and display such combined images 241, 243 and 244 on display unit 24. Controller 28 of mobile terminal 2 may process data of video 241 of the video call, the shared image 243 and the edited information 244 received as individual information, and display on display unit 24 the video 241 of the video call and the shared image 243 reflecting the edited information 244.

As above, the shared image 243 and the edited information 244 according to the present embodiment are displayed together with the video 241 of the video call. Accordingly, a user of mobile terminal 2 may immediately receive and view the edited result of the shared image from the counterpart during a video call to the counterpart, and may share more information efficiently.

Figure 5C:
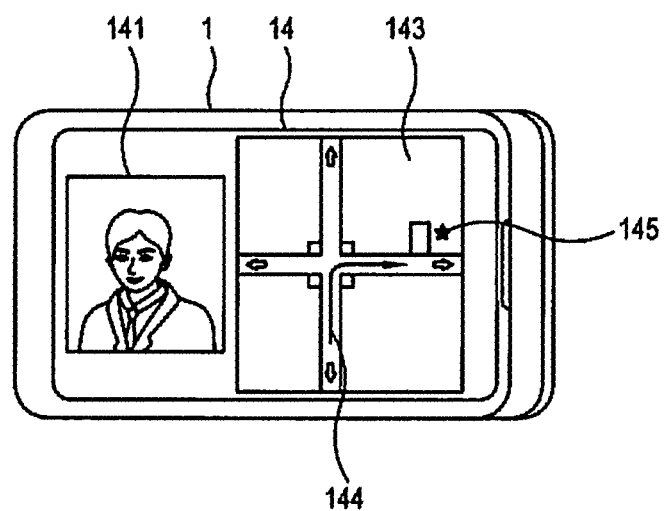
Figure 6B:
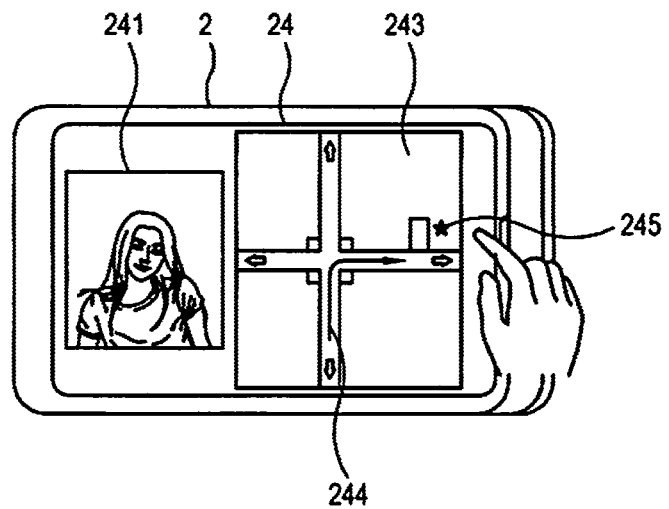

According to another embodiment, referring to step 404 in FIG. 4, controller 28 of mobile terminal 2 may edit the shared image 243 according to user input through user input unit 26, and in step 405 transmit to the counterpart mobile terminal 1 the edited information 245 of FIG. 6B according to user input. Referring to step 305 in FIG. 3, controller 18 of mobile terminal 1 receives edited information 245 of the counterpart mobile terminal 2, and displays on display unit 14 the shared image 143 reflecting the counterpart's edited information 145, as shown in FIG. 5C. Accordingly, both parties to the call may participate in editing the shared image, and share the image more conveniently.

Editing the shared image 143 is not limited to the foregoing embodiment, and may vary. For example, enlarging, reducing or rotating the shared image 143 or changing color or adjusting at least a part of the shared image 143 may fall under editing. Text input by a user may also be added to the shared image 143.

Hereinafter, another embodiment of the present invention will be described with reference to FIGS. 1, and 7 through 11. Referring to FIG. 1, mobile terminal 2 according to the present embodiment communicates with a display apparatus 3 such as a Television (TV). FIG. 7 is a block diagram of display apparatus 3 according to the embodiment of the present invention. As shown therein, display apparatus 3 may include a signal receiver 31, a signal processor 32, a display unit 33, a wireless communication unit 34, a user input unit 35 and a controller 36.

Signal receiver 31 receives an image signal. The image signal according to the present embodiment includes a broadcasting signal having a plurality of channels. The broadcasting signal may include a Digital TV (DTV) signal. Signal processor 32 processes an image signal received by signal receiver 31. Signal processor 32 may demultiplex, decode, enhance or scale the image signal. Display unit 33 displays an image thereon based on an image signal processed by signal processor 32. Display unit 33 may include a display device (not shown) such as an LCD, a Plasma Display Panel (PDP), or an Organic Light Emitting Diode (OLED).

Wireless communication unit 34 communicates with mobile terminal 2. Communication between wireless communication unit 34 and mobile terminal 2 includes a home network communication such as Digital Living Network Alliance (DLNA). Wireless communication unit 23 of mobile terminal 2 further includes a communication function with respect to wireless communication unit 34 of display unit 33. User input unit 35 is provided as a remote controller or a manipulation panel, and receives user input. Controller 36 controls display apparatus 3 as a whole. Display apparatus 3 may further include a voice output unit (not shown) to output a voice such as a speaker and a power supply unit (not shown) to supply power.

Figure 8:
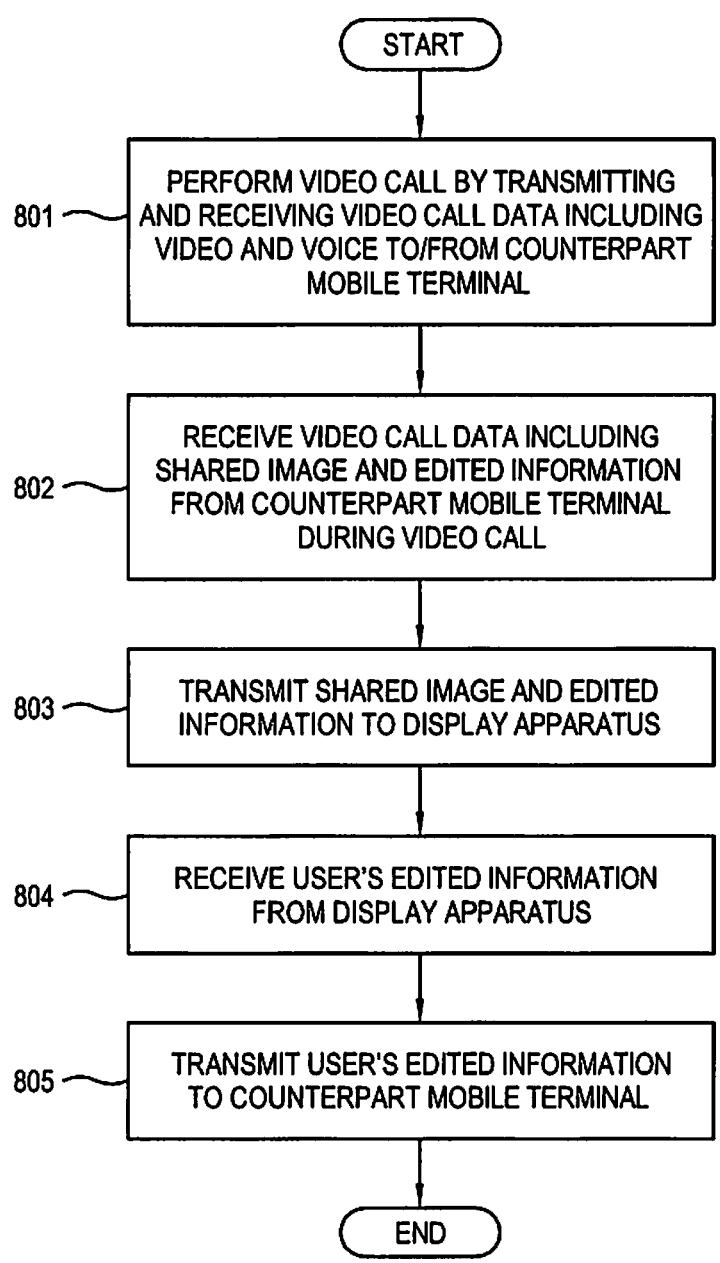
FIGS. 8 and 9 are flowcharts showing operations of the mobile terminal in FIG. 2 and the display unit in FIG. 7.
Figure 9:
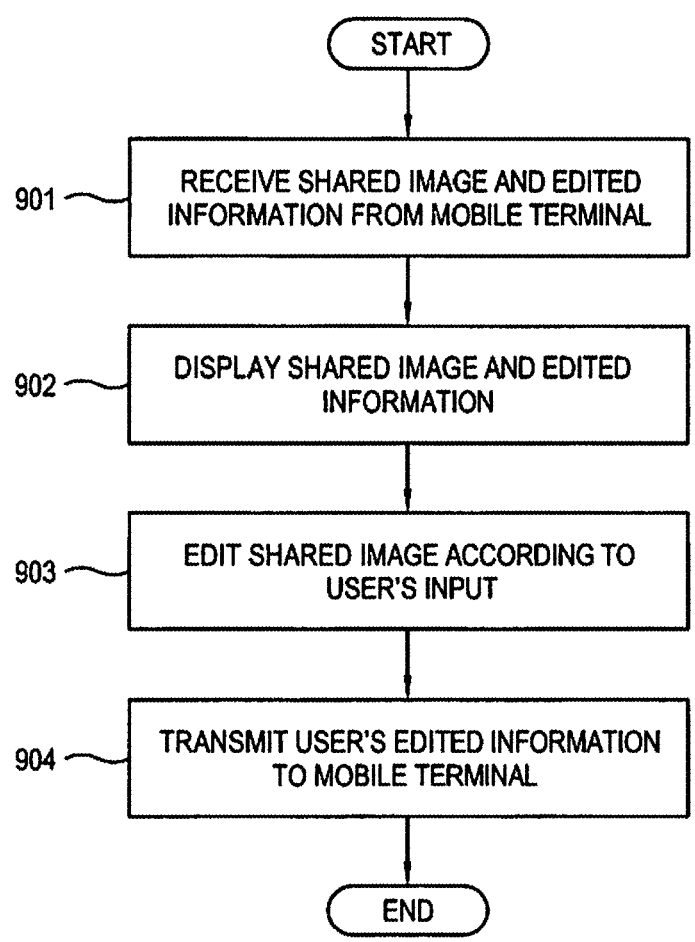

FIGS. 8 and 9 are flowcharts of operations of mobile terminal 2 and display apparatus 3 according to the present embodiment. FIGS. 10 and 11 illustrate a display state of mobile terminal 2 and display apparatus 3 as shown in FIGS. 8 and 9. Hereinafter, mobile terminal 2 according to the present embodiment will be described with reference to FIGS. 8 to 11, and the configuration which is the same or similar to that of mobile terminal 2 according to the foregoing embodiment described with reference to FIGS. 2 to 6 will be omitted.

Figure 10A:
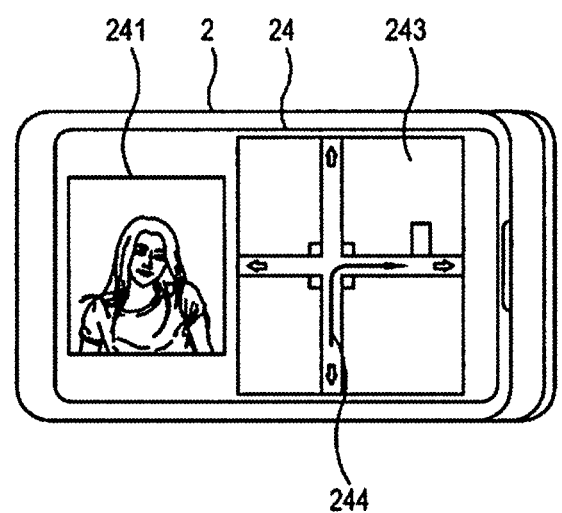
FIGS. 10A-10C and 11A-11B are diagrams illustrating display states of the mobile terminal in FIGS. 8 and 9.

Referring to FIG. 8, in step 801, controller 28 of mobile terminal 2 transmits and receives video call data including a video and a voice to/from the counterpart mobile terminal 1 and performs a video call. During the video call, in step 802, controller 28 of mobile terminal 2 receives the video call data including the shared image and the edited information from the counterpart mobile terminal 1. The received shared image 243 and the edited information 244 may be displayed on display unit 24 together with the video 241 of the video call as shown in FIG. 10A.

Figure 10B:
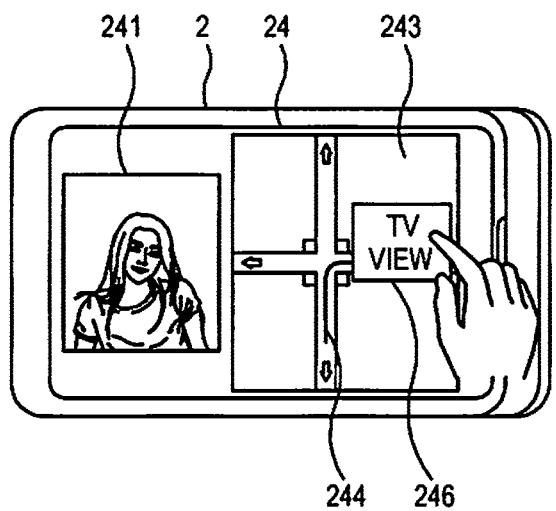

In step 803, controller 28 of mobile terminal 2 transmits to display apparatus 3 the received shared image 243 and the edited information 244 through wireless communication unit 23 during the video call. As shown in FIG. 10B, in transmitting the shared image 243 and the edited information 244 to display apparatus 3, controller 28 of mobile terminal 2 may display menu 246 on display unit 33 for transmitting the shared image, have a user select menu 246 through user input unit 35, and initiate transmitting the shared image 243 and the edited information 244.

Figure 11A:
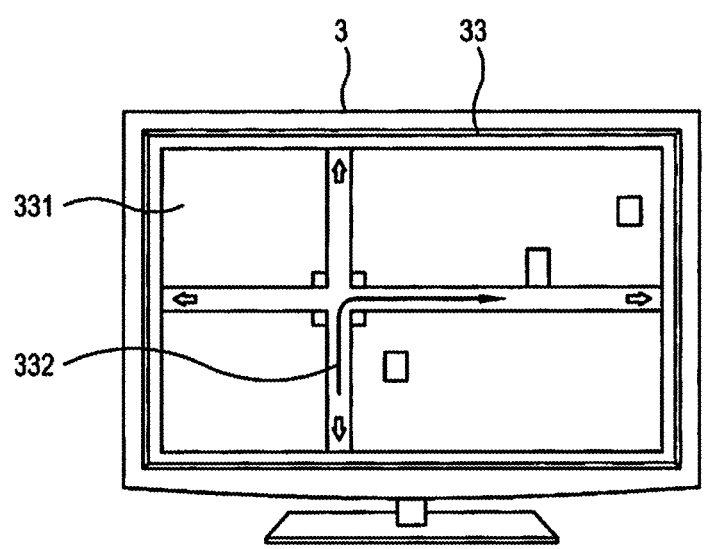

In step 901 of FIG. 9, controller 36 of display apparatus 3 receives the shared image 243 and the edited information 244 from mobile terminal 2 through wireless communication unit 34. In step 902, controller 36 of display apparatus 3 displays on display unit 33 a shared image 331 reflecting edited information 332 received from mobile terminal 2 as shown in FIG. 11A. This enables users to share the shared image and the edited information on a screen larger than mobile terminal 2, with better picture quality, also improving the information sharing environment.

Figure 11B:
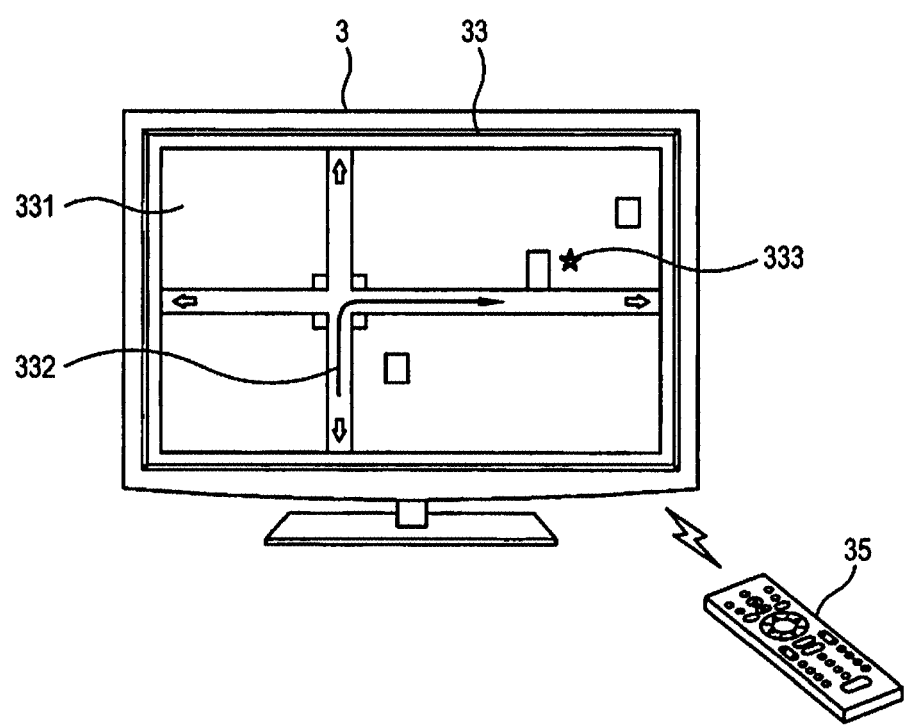

In step 903 of FIG. 9, controller 36 of display apparatus 3 edits the shared image 331 displayed on display unit 33 according to user input through user input unit 35 such as a remote controller. Editing the shared image 331 in display apparatus 3 may include, e.g., adding an image 333 of a user's gesture with respect to the shared image 331 as shown in FIG. 11B. Image 333 is another example of the edited information. The shared image 331 may be edited by selecting a key of the remote controller of user input unit 35 in display apparatus 3 or may be edited by detecting a user's motion or gesture by a motion sensor (not shown) of the remote controller of user input unit 35. In step 904 of FIG. 9, controller 36 of display apparatus 3 transmits to mobile terminal 2 the edited information 333 according to user input through wireless communication unit 24. Only the edited information 333 may be transmitted to mobile terminal 2 or the shared image 331 reflecting the edited information 333 may be transmitted.

Figure 10C:
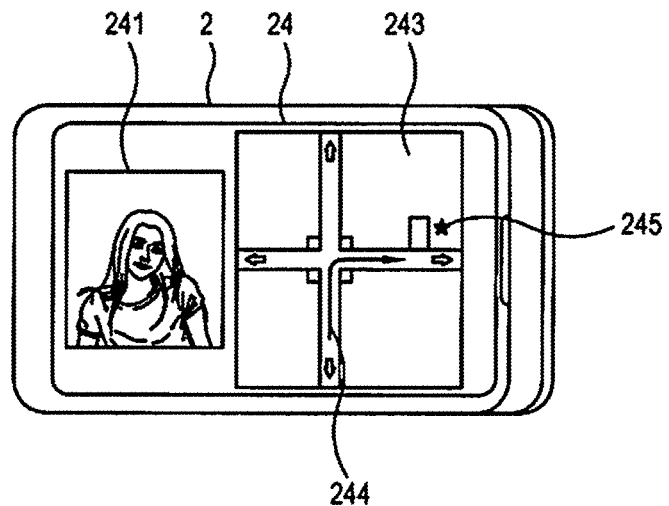

Referring to FIG. 8, in step 804, controller 28 of mobile terminal 2 receives a user's edited information 333 with respect to the shared image 333 from display apparatus 3. As shown in FIG. 10C, the received edited information 245 may be displayed on display unit 24. Returning to FIG. 8, in step 805, controller 28 of mobile terminal 2 transmits to the counterpart mobile terminal 1 the shared image 243 and the edited information 245 together with the video 141 of the video call.

Hereinafter, mobile terminal 2 according to another embodiment of the present invention will be described. The configuration of mobile terminal 2 which is the same or similar to that of mobile terminal 2 according to the foregoing embodiment described with reference to FIGS. 1 through 11 will be omitted. According to the present embodiment, it is assumed that a plurality of electronic devices (not shown) which can be connected to mobile terminal 2 for communication exists around mobile terminal 2. The electronic device according to the present embodiment includes all of devices which communicate with mobile terminal 2 and display an image such as a computer system or a smart phone as well as display apparatus 3 described with reference to FIGS. 7, 9 and 11.

During a video call to the counterpart mobile terminal 1, mobile terminal 2 selects at least one of a plurality of electronic devices, and transmits the shared image to the selected electronic device. The electronic device displays the shared image transmitted by mobile terminal 2. Mobile terminal 2 may transmit to the selected electronic device the edited information of the shared image and/or a video of the video call, together with the shared image, and the electronic device may display the transmitted edited information and/or the video of the video call. Mobile terminal 2 may transmit the shared image to at least one of a plurality of electronic devices that a user has selected.

In selecting the electronic device among the plurality of electronic devices to transmit the shared image, etc., a characteristic of each electronic device may be considered. The characteristic of the electronic device according to the present embodiment includes a characteristic of the device itself, the surrounding environment, connectivity, and a supporting codec. Information of the characteristic of the plurality of electronic devices (hereinafter, "device character information") may be transmitted to mobile terminal 2 from each electronic device or stored in advance in storage unit 27 of mobile terminal 2. Mobile terminal 2 refers to the device character information, and selects at least one of a plurality of electronic devices which is determined to be proper for transmitting the shared image.

In selecting the electronic device to transmit the shared image, etc., a characteristic of the shared image may be considered. The characteristic of the shared image according to the present embodiment includes a resolution of an image, data volume, etc. Mobile terminal 2 may select at least one of a plurality of electronic devices that corresponds to the characteristic of the shared image to be transmitted. For example, if a resolution of the shared image is high, mobile terminal 2 may select an electronic device that has high display resolution among the plurality of electronic devices. As another example, if the data volume of the shared image is large, mobile terminal 2 may select an electronic device that has good data processing capability (or processing performance, processing speed) among the plurality of electronic devices.

In selecting the electronic device to transmit the shared image, etc., a characteristic of a user of mobile terminal 2 may be considered. The characteristic of a user according to the present embodiment includes age, physical condition, preference and device usage pattern of a user. Information of a user's characteristic (hereinafter, "user character information") may be stored in storage unit 27 of mobile terminal 2. The user character information may be set and/or changed by a user of mobile terminal 2. Mobile terminal 2 may refer to the user character information and select at least one of a plurality of electronic devices that corresponds to a user's characteristic. For example, if a user is presbyopic, an electronic device having a larger screen may be selected.

Mobile terminal 2 may convert the shared image to be consistent with the electronic device which receives such shared image. Mobile terminal 2 may convert the shared image in consideration of the device character information of the electronic device. For example, mobile terminal 2 may change a resolution or format of the shared image to be consistent with the electronic device that receives such shared image.

Although several embodiments have been shown and described, it will be appreciated by those skilled in the art that changes may be made in these embodiments without departing from the principles and spirit of the invention, the scope of which is defined in the appended claims and their equivalents.

What is claimed is:

1. A portable device for performing a video communication, the portable device comprising:
   a touch display;
   a wireless communication interface;
   a memory storing instructions; and
   a processor configured to execute the stored instructions to at least:
      control to perform a video communication with another portable device through the wireless communication interface by sending video data toward the other portable device and receiving video data originating from the other portable device,
      control to send, toward the other portable device, a selection of a content to be displayed in the other portable device during the video communication to cause the selected content to be displayed in the other portable device, wherein the content is stored in the other portable device,
      control to provide video data in a first display area of the touch display and provide the selected content in a second display area of the touch display based on the selection during the video communication,
      control to receive first handwritten information originating from the other portable device as data separate from the selected content, wherein the first handwritten information is associated with the selected content,
      control to provide the selected content and the received first handwritten information together in the second display area during the video communication based on association between the selected content and the received first handwritten information, and
      control to send, toward the other portable device, second handwritten information inputted in the second display area in which the selected content and the received first handwritten information are provided together during the video communication as data separate from the selected content, wherein the second handwritten information is associated with the selected content,
   wherein video data, the first handwritten information, the second handwritten information, and the selected content are communicated through the same wireless communication interface.

2. The portable device according to claim 1, wherein the content and the second handwritten information are associated with the video communication for sending video data to the other portable device.

3. The portable device according to claim 1, wherein the selected content and the second handwritten information are associated with video data.

4. The portable device according to claim 1, wherein the processor is configured to execute the stored instructions further to control to provide video data and the selected content together to the touch display of the portable device.

5. The portable device according to claim 3, wherein the selected content and the second handwritten information are associated with video data based on adding identification information to the selected content and the second handwritten information.

6. The portable device according to claim 1, wherein at least one of the first handwritten information and the second handwritten information includes a handwritten drawing.

7. The portable device according to claim 1, wherein video data is obtained through a camera of the portable device.

8. The portable device according to claim 1, wherein the processor is configured to execute the stored instructions further to control to provide text information in the second display area of the touch display of the portable device during the video communication.

9. A control method of a portable device for performing a video communication, the control method comprising:
controlling to perform a video communication with another portable device through a wireless communication interface by sending video data toward the other portable device and receiving video data originating from the other portable device;
controlling to send, toward the other portable device, a selection of a content to be displayed in the other portable device during the video communication to cause the selected content to be displayed in the other portable device, wherein the content is stored in the other portable device;
controlling to provide video data in a first display area of the touch display and provide the selected content in a second display area of the touch display based on the selection during the video communication;
controlling to receive first handwritten information originating from the other portable device as data separate from the selected content, wherein the first handwritten information is associated with the selected content;
controlling to provide the selected content and the received first handwritten information together in the second display area during the video communication based on association between the selected content and the received first handwritten information; and
controlling to send, toward the other portable device, second handwritten information inputted in the second display area in which the selected content and the received first handwritten information are provided together during the video communication as data separate from the selected content, wherein the second handwritten information is associated with the selected content,
wherein video data, the first handwritten information, the second handwritten information, and the selected content are communicated through the same wireless communication interface.

10. The control method according to claim 9, wherein the content and the second handwritten information are associated with the video communication for sending video data to the other portable device.

11. The control method according to claim 9, wherein the selected content and the second handwritten information are associated with video data.

12. The control method according to claim 9, further comprising:
controlling to provide video data and the selected content together to the touch display of the portable device.

13. The control method according to claim 11, wherein the selected content and the second handwritten information are associated with video data based on adding identification information to the selected content and the second handwritten information.

14. The control method according to claim 9, wherein at least one of the first handwritten information and the second handwritten information includes a handwritten drawing.

15. The control method according to claim 9, further comprising:
controlling to provide text information in the second display area of the touch display of the portable device during the video communication.

16. A non-transitory computer readable recording medium storing instructions executable by a processor of a portable device for performing a video communication to cause the processor to at least:
control to perform a video communication with another portable device through a wireless communication interface by sending video data toward the other portable device and receiving video data originating from the other portable device;
control to send, toward the other portable device, a selection of a content to be displayed in the other portable device during the video communication to cause the selected content to be displayed in the other portable device, wherein the content is stored in the other portable device;
control to provide video data in a first display area of the touch display and provide the selected content in a second display area of the touch display based on the selection during the video communication;
control to receive first handwritten information originating from the other portable device as data separate from the selected content, wherein the first handwritten information is associated with the selected content;
control to provide the selected content and the received first handwritten information together in the second display area during the video communication based on association between the selected content and the received first handwritten information; and
control to send, toward the other portable device, second handwritten information inputted in the second display area in which the selected content and the received first handwritten information are provided together during the video communication as data separate from the selected content, wherein the second handwritten information is associated with the selected content,
wherein video data, the first handwritten information, the second handwritten information, and the selected content are communicated through the same wireless communication interface.

17. The non-transitory computer readable recording medium according to claim 16, wherein the content and the second handwritten information are associated with the video communication for sending video data to the other portable device.

18. The non-transitory computer readable recording medium according to claim 16, wherein the selected content and the second handwritten information are associated with video data.

19. The non-transitory computer readable recording medium according to claim 16,
   wherein the instructions cause the processor further to control to provide video data and the selected content together to the touch display of the portable device.

20. The non-transitory computer readable recording medium according to claim 18, wherein the selected content and the second handwritten information are associated with video data based on adding identification information to the selected content and the second handwritten information.

21. The non-transitory computer readable recording medium according to claim 16, wherein at least one of the first handwritten information and the second handwritten information includes a handwritten drawing.

22. The non-transitory computer readable recording medium according to claim 16, wherein the video data is obtained through a camera of the portable device.

23. The non-transitory computer readable recording medium according to claim 16, wherein the instructions cause the processor further to control to provide text information in the second display area of the touch display of the portable device during the video communication.

24. A control method of a portable device for performing a video communication, the control method comprising:
   performing a video communication with another portable device through a wireless communication interface by sending video data toward the other portable device and receiving video data originating from the other portable device;
   sending, toward the other portable device, a selection of a content to be displayed in the other portable device during the video communication to cause the selected content to be displayed in the other portable device, wherein the content is stored in the other portable device;
   providing video data in a first display area of the touch display and providing the selected content in a second display area of the touch display based on the selection during the video communication;
   receiving first handwritten information originating from the other portable device as data separate from the selected content, wherein the first handwritten information is associated with the selected content;
   providing the selected content and the received first handwritten information together in the second display area during the video communication based on association between the selected content and the received first handwritten information; and
   sending, toward the other portable device, second handwritten information inputted in the second display area in which the selected content and the received first handwritten information are provided together during the video communication as data separate from the selected content, wherein the second handwritten information is associated with the selected content,
   wherein video data, the first handwritten information, the second handwritten information, and the selected content are communicated through the same wireless communication interface.

25. The control method according to claim 24, wherein the content and the second handwritten information are associated with the video communication for sending video data to the other portable device.

26. The control method according to claim 24, wherein the selected content and the second handwritten information are associated with video data.

27. The control method according to claim 24, further comprising:
   displaying video data and the content together on the touch display of the portable device.

28. The control method according to claim 26, wherein the selected content and the second handwritten information are associated with video data based on adding identification information to the selected content and the second handwritten information.

29. The control method according to claim 24, wherein at least one of the first handwritten information and the second handwritten information includes a handwritten drawing.

30. The control method according to claim 24, further comprising:
   displaying text information in the second display area of the touch display of the portable device during the video communication.

* * * * *